Oct. 14, 1958 M. HALICZER Re. 24,549

ACCORDION-FOLDED FACE MASK

Original Filed Oct. 28, 1953 2 Sheets-Sheet 1

INVENTOR.
MARCUS HALICZER
BY
ATTORNEY

ACCORDION-FOLDED FACE MASK

Original Filed Oct. 28, 1953 2 Sheets-Sheet 2

INVENTOR.
MARCUS HALICZER
BY
ATTORNEY

United States Patent Office

Re. 24,549
Reissued Oct. 14, 1958

24,549

ACCORDION-FOLDED FACE MASK

Marcus Haliczer, New York, N. Y.

Original No. 2,752,916, dated July 3, 1956, Serial No. 388,818, October 28, 1953. Application for reissue June 30, 1958, Serial No. 745,776

6 Claims. (Cl. 128—141)

Matter enclosed in heavy brackets [ ] appears in the original patent but forms no part of this reissue specification; matter printed in italics indicates the additions made by reissue.

This invention relates to protective face masks of the type used for preventing the spread of respiratory infections. More particularly, the invention has reference to a mask of this type characterized by its ready disposability, low cost, and adaptability for being folded into an article of small size.

Most usually, a protective mask of the type referred to above is formed in a manner that increases the cost thereof to an undesirable extent. In many instances, a flat piece of woven fabric or the like is used, hemmed at its ends to receive ear loops or the ends of a head-encircling band. Further, it has been observed that in general, the construction of face masks as conventionally designed is such as to make it somewhat difficult to reduce the mask to a minimum size when packaging the same for shipment or sale, the mask often being left unfolded or being folded somewhat haphazardly. It will be readily appreciated, in this regard, that such construction adds measurably to the manufacturing cost of the mask, and this is an important consideration in the manufacture of an article of this type, since the article must sell at a low price if it is to be at all commercially feasible.

Apart from the above, masks as now made must all be fully opened when in use, since the above discussed construction thereof results in the provision of an approximately cup-shaped or concaved body intended to fit over the nose, mouth, and chin of the user. The masks in present day use are thus appropriately to be considered as being of a standard size, resulting in discomfort when, as is often the case, the wearer's facial size or features are small.

The main object of the present invention, accordingly, is to provide a face mask of generally improved design having none of the disadvantages of conventional masks noted above.

A more specific object is to design a face mask that will be characterized by formation of the body thereof in a pleated or accordion-folded condition, thus to permit the mask to be folded completely flat, when being readied for shipment or sale, and thereby reduce the overall thickness thereof to one no greater than the combined thicknesses of its flat, superposed, registered accordion folds.

Another object is to so design the folds of the mask as to permit only selected folds to be opened when the mask is to be worn, thus to accommodate the mask to the facial size of the wearer.

A further object of importance is to so dimension the outermost laminations of the folded mask as to define thereon a pair of lips extending longitudinally of the same, with said lips being particularly adapted to facilitate opening of the mask for use.

Yet another object of the invention is to reduce measurably the cost of the mask by construction thereof from inexpensive fibrous stock such as thin tissue of a disposable nature, thereby allowing a single use to be made of the mask, to further promote sanitation and prevent the spread of infection.

Other objects of importance are to design a mask that can be adapted for sale of a substantial quantity of individually packaged masks in a small package; that will be adapted for dispenser packaging; that will be capable of manufacture by automatic equipment; will adjust itself closely but comfortably to the wearer's facial contours; will not require tying when being put on; and will offer complete coverage of the wearer's nose, mouth and chin.

For further comprehension of the invention, and of the objects and advantages thereof, reference will be had to the following description and accompanying drawings, and to the appended claims in which the various novel feature of the invention are more particularly set forth.

In the accompanying drawings forming a material part of this disclosure:

Figure 5:
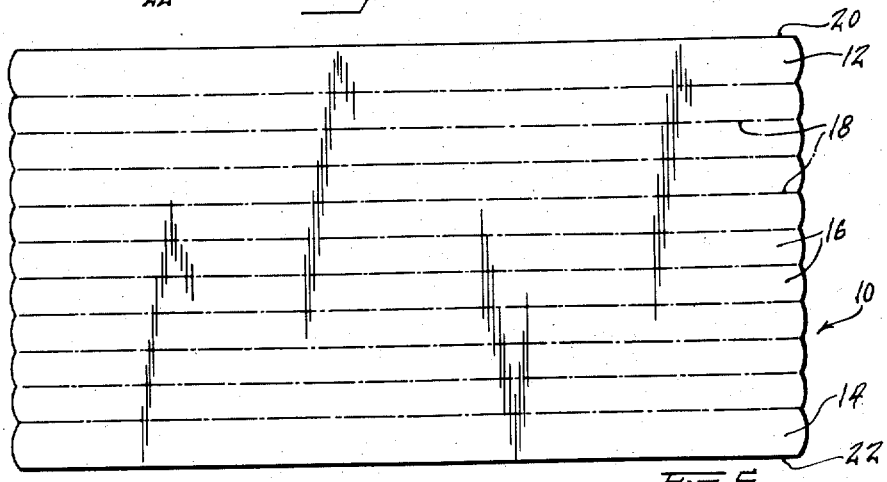
Fig. 5 is a plan view of the blank used in forming the mask.

The mask constituting the invention has been generally designated at 10, and includes a flexible body fashioned from a blank shaped as shown in Fig. 5. The body of the mask can be formed from any suitable material, and preferably, a very inexpensive, disposable material such as long grain vegetable fiber paper is utilized.

As shown in Fig. 5, the blank has scalloped side edges in the illustrated embodiment of the invention, but it will be understood that alternatively, straight side edges can be provided thereof, depending on the desired end formation on the mask. Scalloped edges are adapted to impart a transversely curved configuration to the ends of the mask when the same is folded, to increase the attractiveness thereof, but if it is desired that straight end edges be formed on the folds of the mask, the blank shown in Fig. 5 would be left wholly rectangular.

In any event, the blank is folded to form a plurality of superposed, contacting, accordion folds of elongated, substantially rectangular configuration, the folds defining outer panels or laminations 12, 14 and inner panels 16.

As will be noted from Fig. 5, the fold lines of the blank are uniformly spaced apart from one another, but the distance between the outermost fold lines and the outer longitudinal edges of panels 12, 14 is slightly greater than the distance between any pair of adjacent fold lines. As a result, the outer panels are slightly greater in width than the panels 16. Therefore, when the mask is folded, exposed longitudinal lips 20, 22 are defined at opposite sides of the mask on the panels 12, 14, respectively, the lip 20 extending in one direction from the folded body, that is upwardly in the several figures of the drawings, and the lip 22 extending downwardly, in an opposite direction. This facilitates grasping of the outer panels by the wearer when the mask is to be unfolded, and it is merely necessary that one grasp the respective lips with both hands, and pull outwardly thereon in opposite directions from the body. The accordion folds are thus pulled apart, and can be opened to a selected extent to accommodate the mask to the facial size and contours of the particular wearer.

Figure 4:
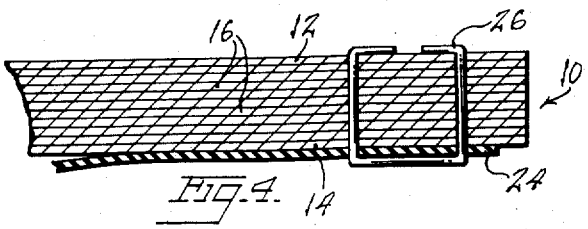
Fig. 4 is an enlarged, fragmentary sectional view on line 4—4 of Fig. 2.

When the mask has been folded in the manner shown, a head band 24, which can be a thin elasticized strip of fabric or the like, is arranged longitudinally and centrally of the folded body, overlying one of the outer panels, in the illustrated example the panel 14. Conventional staples 26 of the type used for stapling paper can then be applied, as shown in Fig. 4, to attach the ends of the head band to the body while at the same time closing the ends of the accordion folds.

Figure 1:
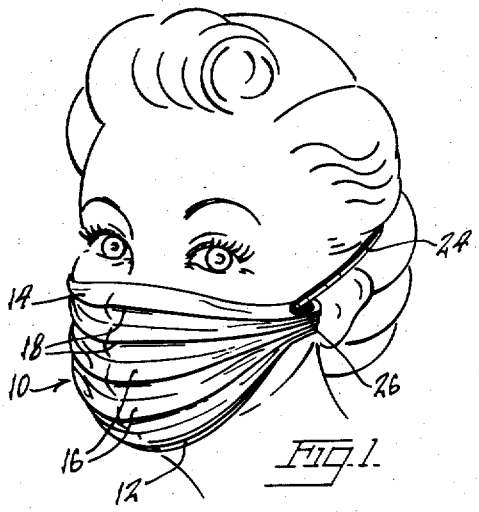
Fig. 1 is a view of the mask as it appears when worn.
Figure 3:
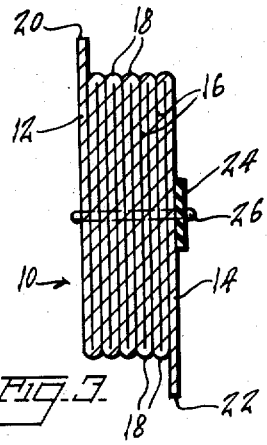
Fig. 3 is an enlarged transverse sectional view on line 3—3 of Fig. 2.
Figure 2:
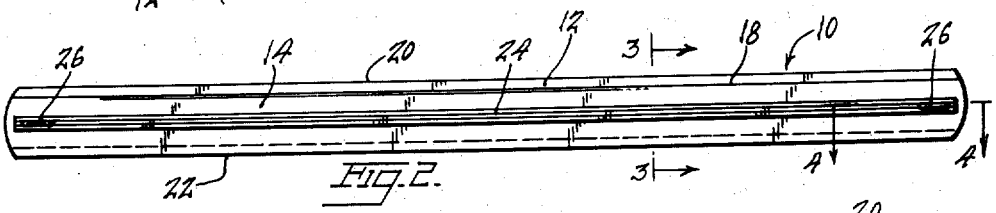
Fig. 2 is a side elevational view of the mask folded.

The device is now ready for use and when opened, will effectively cover the nose, mouth, and chin of the wearer, the opened mask tapering toward its opposite ends from the middle portion thereof, as shown in Fig. 1.

Figure 6:
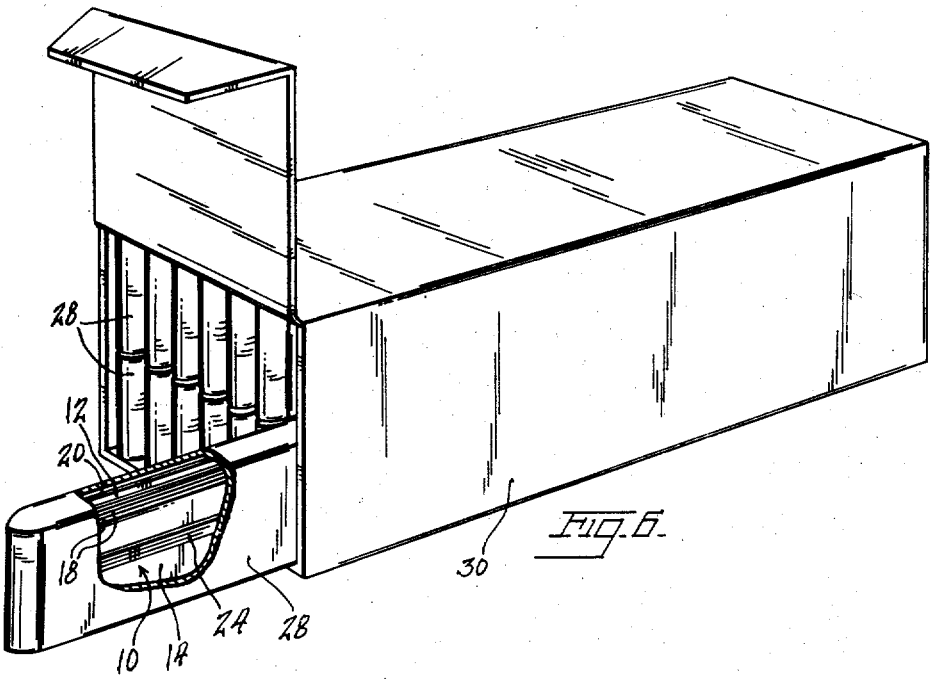
Fig. 6 is a perspective view showing a plurality of the masks packaged individually for shipment or sale, one of the individual packages being extended partially from the container and being partially broken away.

In Fig. 6, the adaptability of the mask for packaging has been illustrated, this being an important characteristic of the illustrated mask formation. Each folded mask is readily insertable in a flat, narrow envelope of paper or the like, and thereafter sealed in the envelope to keep the mask sterile until the envelope is opened. The several envelopes are then housed compactly in a cardboard or metallic container 30 for shipment and sale.

Figure 7:
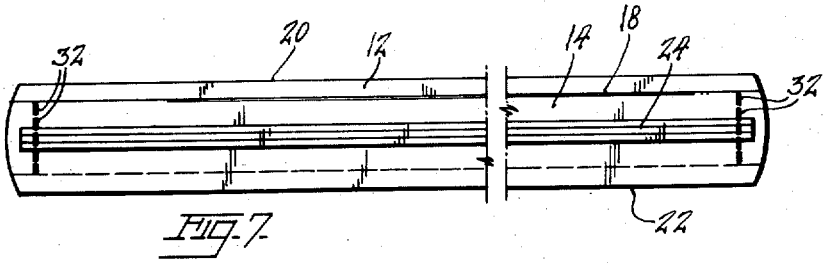
Fig. 7 is a side elevational view, portions being broken away, showing a modified mask.

Referring now to Fig. 7, a modified form of the mask is here shown, wherein the folded body is identical to that of the first form. The same is true of the head band, the difference in construction residing in the use of transverse rows of stitching 32 for connecting the band to the body instead of staples.

Figure 8:
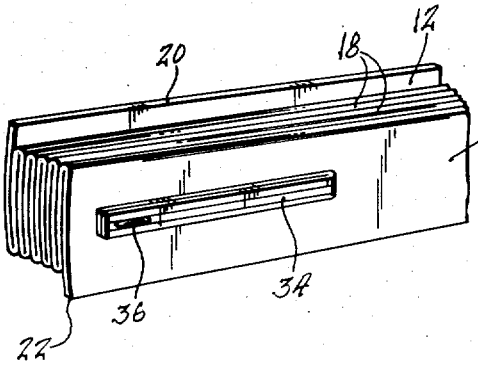
Fig. 8 is a fragmentary perspective view of a second modification.

In Fig. 8, the folded body remains unchanged, but in this instance an elasticized strip 34 is folded on itself at its midlength point, and is stapled at its ends to the body. Strips 34 would be provided at the opposite ends of the mask to form ear loops should the user not desire a head-encircling band.

In all forms of the invention, there is a common characteristic wherein the mask body is composed of a plurality of flat accordion folds permanently closed at their ends to reduce the size of the mask to a minimum when being shipped or sold. The construction has the further advantage of permitting the mask to be opened only to a selected extent, and still further, the construction allows the overall cost to be reduced to a minimum to promote disposability.

While I have illustrated and described the preferred embodiments of my invention, it is to be understood that I do not limit myself to the precise constructions herein disclosed and the right is reserved to all changes and modifications coming within the scope of the invention as defined in the appended claims.

What is claimed is:

1. A face mask comprising a body formed of a single blank, said blank having scalloped side edges to impart a transversely curved configuration to the ends of the mask, said blank being folded along fold lines across the width of said blank forming accordion pleats, the fold lines being uniformly spaced, with the ends folds of greater width than the others to extend beyond the edges of the pleats, and means secured to said body for attaching the mask to the head of a wearer.

2. The combination of claim 1, wherein said last named means comprises an elastic fabric band, and means fastening the ends of said band to said body.

3. The combination of claim 2, wherein said fastener means extend through the folded pleats of the body at the ends thereof to hold the device in folded position.

4. The combination of claim 1, wherein said means secured to said body comprises folded over elastic strips, and staples securing said strips to the blank.

*5. A disposable face mask comprising a body formed of a single blank of fibrous material such as porous tissue, said blank being folded along spaced fold lines extending in parallel relation between the opposite sides of said blank forming a plurality of accordion pleats laterally spreadable to cover a selected portion of the wearer's face when opened, and means secured to said body for attaching the mask to the head of a wearer.*

*6. A disposable face mask comprising a body formed of a single blank of fibrous material such as porous tissue, said blank being folded along spaced fold lines extending in parallel relation between the opposite sides of said blank forming a plurality of accordion pleats having end folds of greater width than the others to extend beyond the edges of the folded pleats, and means secured to said body for attaching the mask to the head of a wearer.*

References Cited in the file of this patent or the original patent

UNITED STATES PATENTS

| | | |
|---|---|---|
| 1,526,322 | Dehne | Feb. 17, 1925 |
| 2,172,455 | Samuel | Sept. 12, 1939 |
| 2,376,871 | Fink | May 29, 1945 |
| 2,494,406 | Reitano | Jan. 10, 1950 |
| 2,507,447 | La Joie et al. | May 9, 1950 |
| 2,634,724 | Burns | Apr. 14, 1953 |

FOREIGN PATENTS

| | | |
|---|---|---|
| 860,976 | France | Oct. 15, 1940 |